United States Patent [19]
Pal

[11] Patent Number: 5,963,945
[45] Date of Patent: Oct. 5, 1999

[54] SYNCHRONIZATION OF A CLIENT AND A SERVER IN A PREFETCHING RESOURCE ALLOCATION SYSTEM

[75] Inventor: Shankar Pal, Redmond, Wash.

[73] Assignee: Microsoft Corporation, Redmond, Wash.

[21] Appl. No.: 08/869,353

[22] Filed: Jun. 5, 1997

[51] Int. Cl.$^6$ .................................................. G06F 17/30
[52] U.S. Cl. ........................ 707/10; 707/205; 707/201; 707/8; 707/3; 711/118; 395/200.57
[58] Field of Search .............................. 395/200.57, 674, 395/726, 200.33; 707/201, 8, 3, 10; 711/118

[56] References Cited

U.S. PATENT DOCUMENTS

| | | | |
|---|---|---|---|
| 5,046,002 | 9/1991 | Takashi et al. | 364/200 |
| 5,218,695 | 6/1993 | Noveck et al. | 707/201 |
| 5,628,005 | 5/1997 | Hurvig | 707/8 |
| 5,673,394 | 9/1997 | Fenwick et al. | 395/200.8 |
| 5,678,007 | 10/1997 | Hurvig | 395/200.12 |
| 5,682,514 | 10/1997 | Yole et al. | 395/445 |
| 5,734,909 | 3/1998 | Bennett | 395/726 |
| 5,822,749 | 10/1998 | Agarwal | 707/2 |

OTHER PUBLICATIONS

Lamport, Leslie, "Time, Clocks, and the Ordering of Events in a Distributed System," *Communications of the ACM*, vol. 21, No. 7, Jul. 1978, pp. 558–565.

Dijkstra, Edsger W. et al., "On the Fly Garbage Collection: An Exercise in Cooperation," *Communications of the ACM*, vol. 21, No. 11, Nov. 1978, pp. 966–975.

*Primary Examiner*—Anton Fetting
*Assistant Examiner*—Jean M. Corrielus
*Attorney, Agent, or Firm*—Schwegman, Lundberg, Woessner & Kluth, P.A.

[57] ABSTRACT

A prefetching resource allocation system is provided. Although performance improvements are realized through the use of prefetching, the use of prefetching introduces a problem where the client and the server may become unsynchronized with respect to their understanding of whether a resource is allocated. The improved resource allocation system prevents this synchronization problem from occurring by maintaining a counter for the client as well as a counter for the server. Each time that the server allocates a resource to the client, the server increments its counter. Similarly, each time that the client receives an indication that the resource has been allocated on its behalf, the client increments its counter. When the client requests the deallocation of a resource, it provides the current value of its counter. Hence, upon receiving a deallocation request, the server determines if the client's counter value received in the deallocation request is less than the server's counter value. If this condition is true, the synchronization problem has been detected because the resource has been allocated to the client while the deallocation request was in transit to the client. Under these circumstances, the improved resource allocation system ignores the deallocation request so that the client and server do not become unsynchronized.

42 Claims, 9 Drawing Sheets

SYNCHRONIZATION OF A CLIENT AND A SERVER IN A PREFETCHING RESOURCE ALLOCATION SYSTEM

TECHNICAL FIELD

The present invention relates generally to data processing systems and, more particularly, to synchronizing a client and a server in a prefetching resource allocation system.

BACKGROUND OF THE INVENTION

Resource allocation systems have been developed that allocate one or more resources to a client that then utilizes the resource. When the client has completed utilizing the resource, the resource allocation systems deallocate the resource. One example of a resource allocation system is a conventional file system. The conventional file system operates as part of an operating system and manages the files within the computer system. The file system receives requests from application programs (i.e., clients) to access the files, and in response to receiving one such request, the file system allocates the file to the application program and may prevent use of the file by other application programs. After the file is allocated to the application program, the application program may read data from the file or write data to the file. From this perspective, the application program is a client, and the file system is a server.

When an application program requests to read data from an allocated file, the file system accesses the file from a secondary storage device and returns the data to the application program. The processing overhead associated with accessing a secondary storage device, such as a hard disk drive, is significantly greater than accessing memory. Therefore, in order to improve performance, some conventional file systems have adopted a prefetching technique. The term "prefetching" refers to a resource allocation system predicting additional resources that the client may soon utilize and allocating those resources at the same time as the requested resource so that if the client does utilize one of the prefetched resources, a significant performance improvement occurs. For example, in some conventional file systems, when an application program requests to read data from a file, the file system will return the data to the application program, and additionally, the file system, regardless of the amount of data requested, will retrieve up to the 64K of data that follows the returned data and store it into a memory buffer (or a memory cache). At a later time, when the application program requests to read more data from the file, if the data is found among the buffered data, a significant performance improvement occurs because memory is accessible much faster than a hard disk drive. Therefore, it is desirable to add prefetching to a resource allocation system.

SUMMARY OF THE INVENTION

An improved resource allocation system that prefetches resources is provided. When prefetching resources, the resource allocation system ensures that the client's and server's understanding of the state of the resources is synchronized so that they do not enter an undesirable state. Such an undesirable state occurs when a client has a copy of a resource, such as a database object, and the server sends a second copy of the database object to the client at the same time that the client sends a deallocation request to the server to deallocate the object from the client. If the second copy of the object is sent to the client at the same time that the client sends the deallocation request, the server may receive the deallocation request after it sent the second copy of the object, and thus, the server may delete any indication that the client has the object allocated to it. In this situation, the server does not know that the client has the object allocated, and the server will not notify the client when the object should no longer be used because it is stale or out of date.

In accordance with a first aspect of the present invention, a method is provided in a data processing system having a server that manages allocation of resources and a client that requests allocation of the resources. In accordance with the first aspect, the method allocates a resource to the client, receives a request to deallocate the resource from the client, and determines whether the resource was allocated for at least a second time to the client before the deallocation request was sent by the client such that the client was unaware of the at least a second time allocation before the deallocation request was sent by the client. When the resource was allocated for at least a second time to the client before the deallocation request was sent by the client such that the client was unaware of the at least a second time allocation before the deallocation was sent by the client, the method ignores the deallocation request to prevent the client and the server from having conflicting indications of the allocation of the resource.

In accordance with a second aspect of the present invention, a data processing system is provided having resources. The data processing system has a memory and a processor. The memory contains a client program for requesting allocation of the resources and for requesting deallocation of the resources. The memory further comprises a server program for managing allocation of the resources, for receiving allocation requests, and for allocating the resources in response to receiving the allocation requests. Additionally, the server program receives deallocation requests, and determines to process or ignore the deallocation requests. A deallocation request requesting the deallocation of a resource is ignored when the resource was allocated for at least a second time to the client program and the client program was unaware of the at least a second time allocation before the deallocation request was made by the client program.

DETAILED DESCRIPTION OF THE INVENTION

Figure 1A:
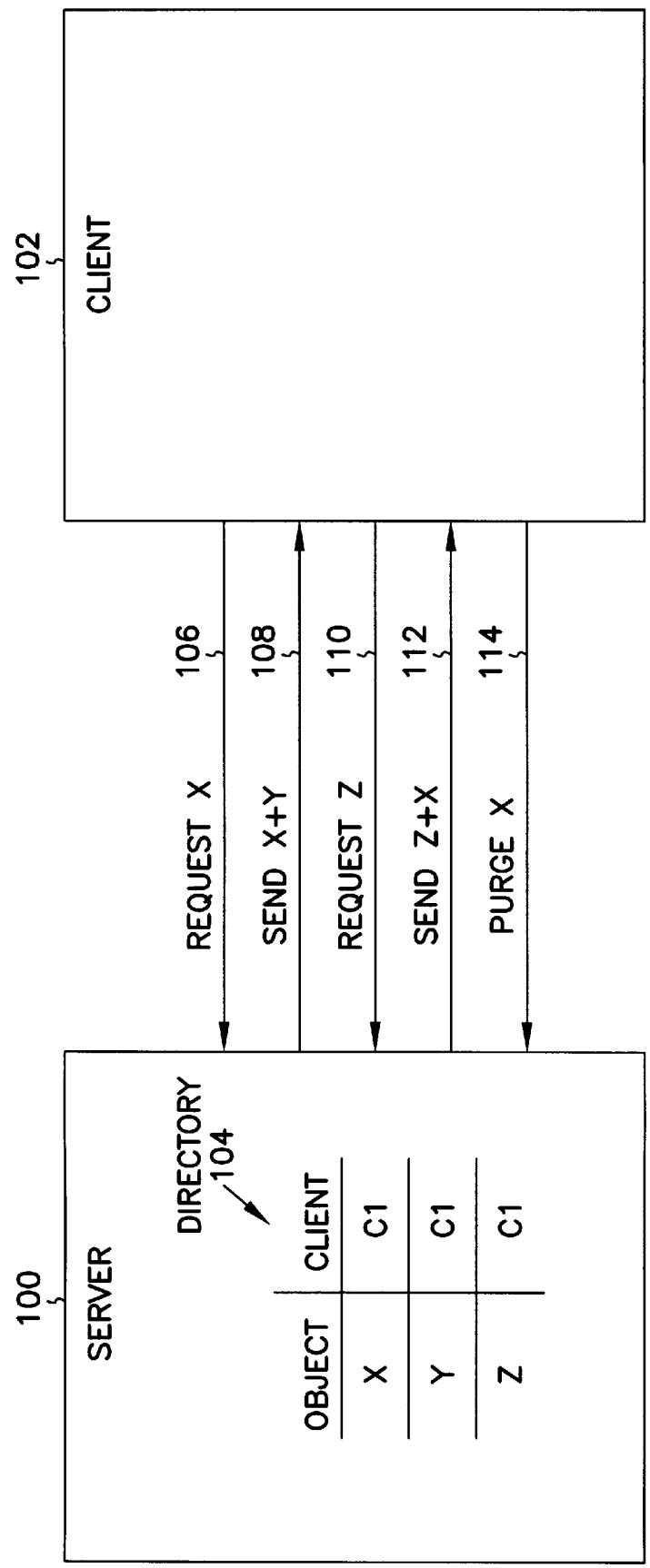
FIG. 1A depicts a client and a server becoming unsynchronized with respect to the state of an object.

In a prefetching resource allocation system, a preferred embodiment of the present invention ensures that the client's and server's understanding of the state of the resources is synchronized so that they do not enter an undesirable state. Such an undesirable state occurs when a client has a copy of a resource, such as a database object, and the server sends a second copy of the database object to the client at the same time that the client sends a deallocation request to the server to deallocate the object from the client. If the second copy of the object is sent to the client at the same time that the client sends the deallocation request, the server may receive the deallocation request after it sent the second copy of the object, and thus, the server may delete any indication that the client has the object allocated to it. In this situation, the server does not know that the client has the object allocated, and the server will not notify the client when the object should no longer be used because it is stale or out of date.

The present invention provides an improved resource allocation system that receives requests from clients to allocate resources and that allocates the requested resources along with additional prefetched resources to the client. The resource allocation system allocates a resource to a client by actually sending a copy of the resource to the client. Thus, a client receives a copy of each resource that it requested to allocate and a copy of each prefetched resource. The client can then access its copy of the allocated resources.

A client may request to allocate a resource that has already been allocated to another client. If the client requests the allocation to modify the resource, then the other client needs to be notified that its copy of the resource will become out of date. To provide this notification, the resource allocation system maintains a table of which resources have been allocated to each client. When an allocation request is received that indicates the resource is to be modified, the resource allocation system searches the table to identify each client to which the requested resource has been allocated. The resource allocation system then sends a notification to the identified clients indicating that the allocated resource will soon be out of date so that the clients can request that the resource be deallocated. However, a synchronization problem can occur when a client requests that the resource allocation system deallocate a resource. When the resource allocation system receives such a deallocation request, the resource allocation system deallocates the resource by updating the table to indicate that the resource is no longer allocated to that client. However, the resource allocation system may have recently sent another copy of that resource to the client. If the client received the other copy of the resource before it sent the deallocation request, then the resource allocation system will correctly update its table when it receives the deallocate request.

But, if the client receives the other copy of the resource after it sent the deallocation request, the resource allocation system will update its table to indicate that the resource is not allocated to the client. When the client then receives the other copy of the resource, it will appear to the client that the resource is again allocated to it. However, because the table has been updated, it will appear to the resource allocation system that the resource is not allocated to the client. This lack of synchronization as to whether the resource is allocated or not is problematic because the resource allocation system will not notify that client when the resource will become out of date. The client would then be using an out-of-date resource.

A preferred embodiment of the present invention ensures synchronization between the client and the server by maintaining a counter for the client as well as a counter for the server. Each time that the server sends a database object to the client, the server increments its counter and stores the current value of the counter with an indication of the client that allocated the object. Similarly, each time the client receives an object, the client increments its counter. When the client sends a deallocation request, it provides the current value of its counter. Hence, before deallocating the object, the server compares the client's counter value against the counter value stored for the client by the server to determine if the client's counter value is less than the stored counter value. If this condition is false, the server performs the deallocation. If this condition is true, however, the object has been allocated to the client, and the client sent the deallocation request before it knew that the object was allocated on its behalf. Therefore, in order to prevent the client and the server from becoming unsynchronized with respect to their understanding of the state of the object, the improved resource allocation system does not perform the deallocation.

As described above, the counters are incremented on a per-object basis. However, one skilled in the art will appreciate that the counters may be incremented on a per-message basis.

In an alternative embodiment, the improved resource allocation system provides synchronization between a client and server when the client has multiple connections to the server. In this case, as will be further described below, the server maintains one counter for each connection, and the client maintains one counter for each connection.

Overview

To better illustrate the synchronization problem that the improved resource allocation system solves, an example of the problem is now provided. FIG. 1A depicts a server 100, a resource allocation system that allocates resources, such as database objects, for use by a client 102. The database objects, for example, are fields within a record or records within a table. The server 100 performs prefetching such that whenever the client 102 requests an object, the server returns at least one additional object which the server predicts that the client will soon need. The prefetching algorithm used by the server 100 prefetches additional database objects that it considers to be related (e.g., additional fields within the same record or additional records within the same table). The server 100 maintains a directory 104 indicating which objects have been allocated and the clients to which each object has been allocated.

In order to allocate and deallocate objects, the server 100 and the client 102 send messages back and forth. Specifically, if the client 102 desires to utilize a database object, such as X, it sends a message 106 to the server 100 requesting the allocation of object X so that the client 102 may utilize object X. Upon receiving the message 106, the server 100 allocates object X to client 102 by entering an indication into the directory 104 that client "C1" (i.e., client 102) has allocated object X. Before sending object X to the client 102, the server 100 prefetches additional database objects in the hope that the client 102 may need them. If the client 102 does in fact eventually need them, since they are already located at the client, the client can realize a performance savings by not incurring the overhead of communicating with the server, which may occur via a network.

After prefetching additional database objects, the server 100 creates a directory entry for the prefetched objects, and the server sends the requested object X as well as the prefetched object Y to the client 102 by sending a message 108. Some time later, the client 102 may request another object, such as Z, in a message 110. In response, the server 100 will allocate Z to the client and prefetch additional objects, which may coincidentally include object X. The server 100 will allocate object X to the client 102 and then send objects Z and X to client 102 in a message 112 so that client 102 may utilize the objects.

The problem that the improved object allocation system solves is if after an object, such as object X, is allocated for a second time to client 102, a deallocation request 114 may be received by the server 100 from the client 102 indicating that object X should be deallocated. The server 100 has no way of knowing if the client 102 knew of the allocation of object X for the second time when it made the deallocation request. Since deallocation in this system is processed by removing the client entry from the directory 104, if the client 102 did not know of the allocation before making the deallocation request, the server 100 will deallocate object X from client 102 by deleting the client entry from the directory 104, and will not notify the client when the object should no longer be used. However, from the client's 102 perspective, it has sent a deallocation request that was followed by the receipt of object X in message 112. Thus, the client 102 will retain and utilize object X without knowing that the server 100 no longer has an indication that the object is allocated to the client. Since the server 100 has removed any indication that client 102 has object X allocated, when object X is updated, it will not notify client 102, and thus client 102 will utilize object X even though it has become out of date. In this situation, the system operates in an undesirable manner.

Figure 1B:
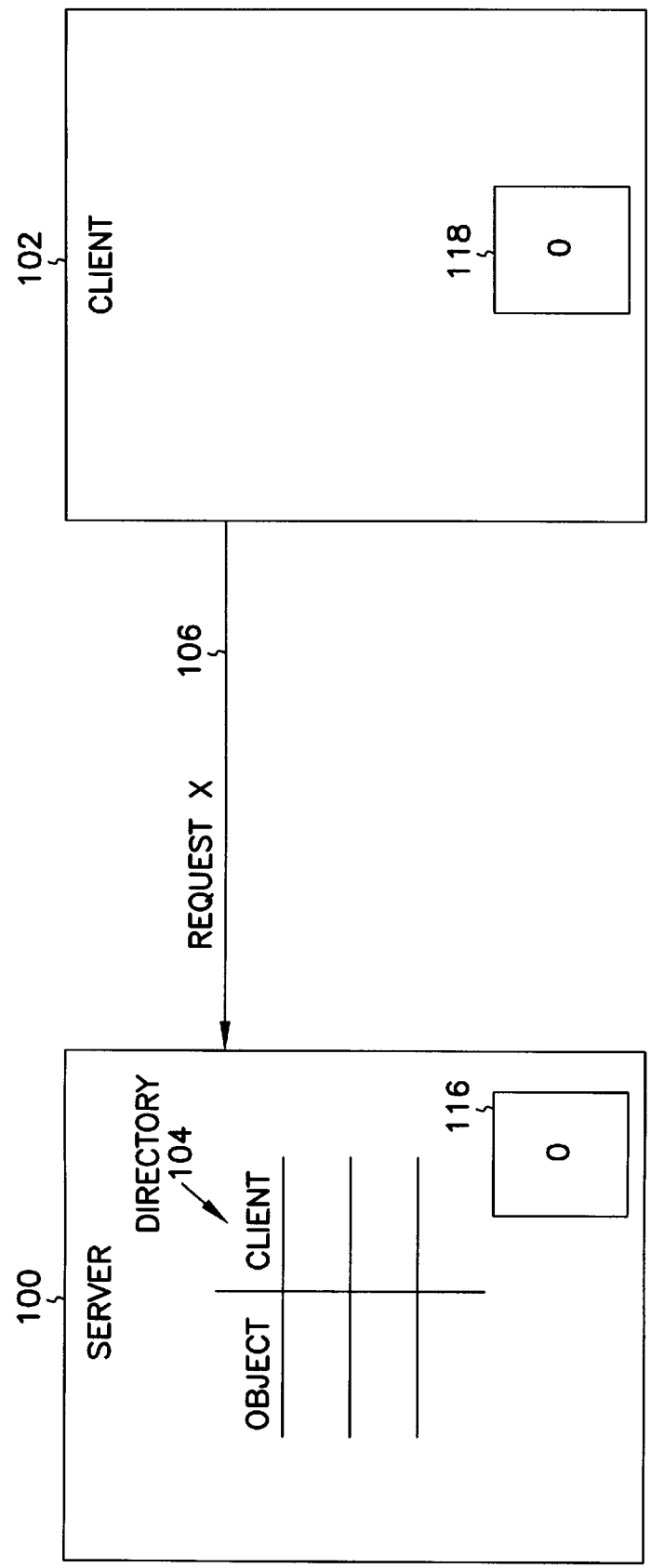
FIG. 1B–1E depict the use of counters by a preferred embodiment of the present invention to solve the synchronization problem depicted in FIG. 1A.

In order to solve this problem, a preferred embodiment utilizes a counter at the server and a counter at the client. FIGS. 1B–1E depict the use of the counters in accordance with a preferred embodiment to overcome the synchronization problem described relative to FIG. 1A. As shown in FIG. 1B, a counter 116 is maintained at the server 100 and a counter 118 is maintained at the client 102. The counters 116, 118 are utilized in such as manner as to prevent the synchronization problem described in FIG. 1A from occurring. The counter 116 of the server 100 is utilized such that before allocating an object to the client 102, the counter 116 is incremented. The client 102 utilizes its counter 118 such that it is incremented every time that it becomes aware of the allocation of an object on its behalf (i.e., receives an object). As shown in FIG. 1B, both of the counters 116 and 118 are initialized to zero when the client sends message 106 requesting object X.

Figure 1C:
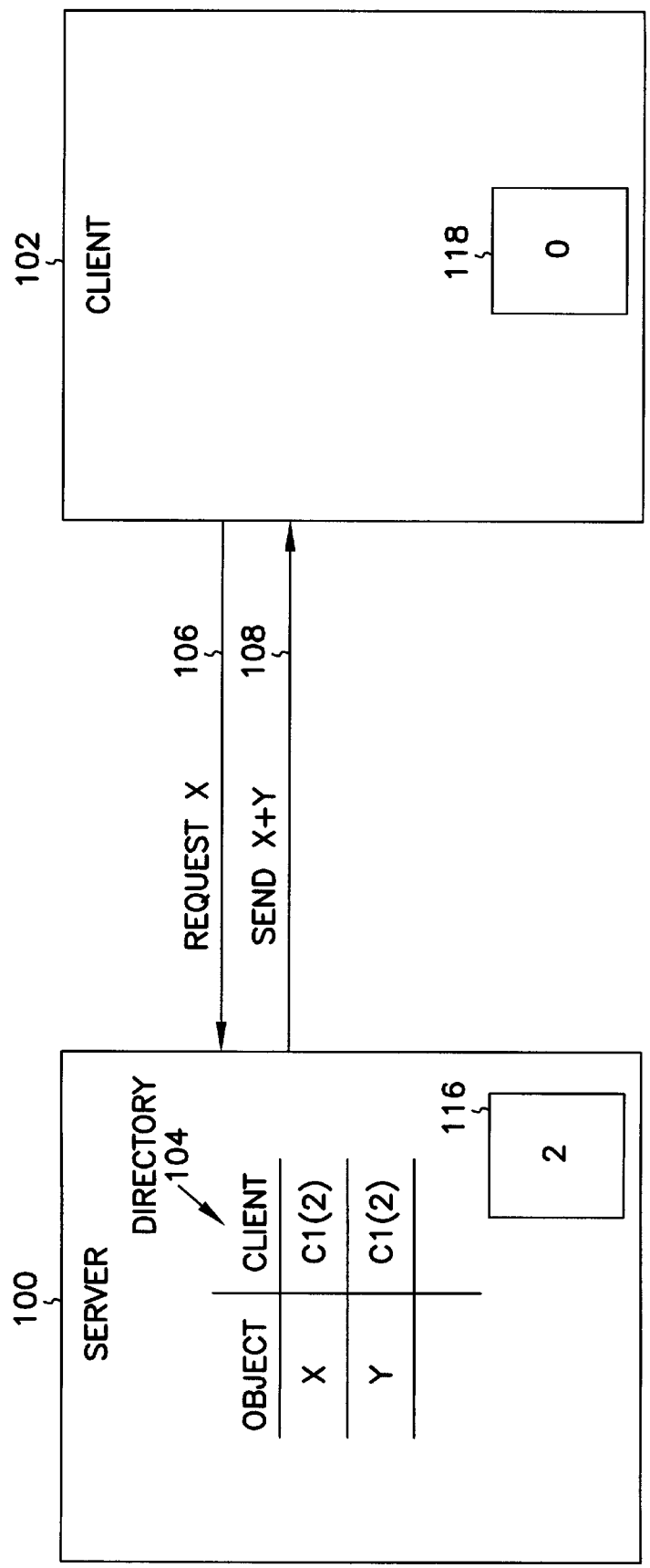
Figure 1D:
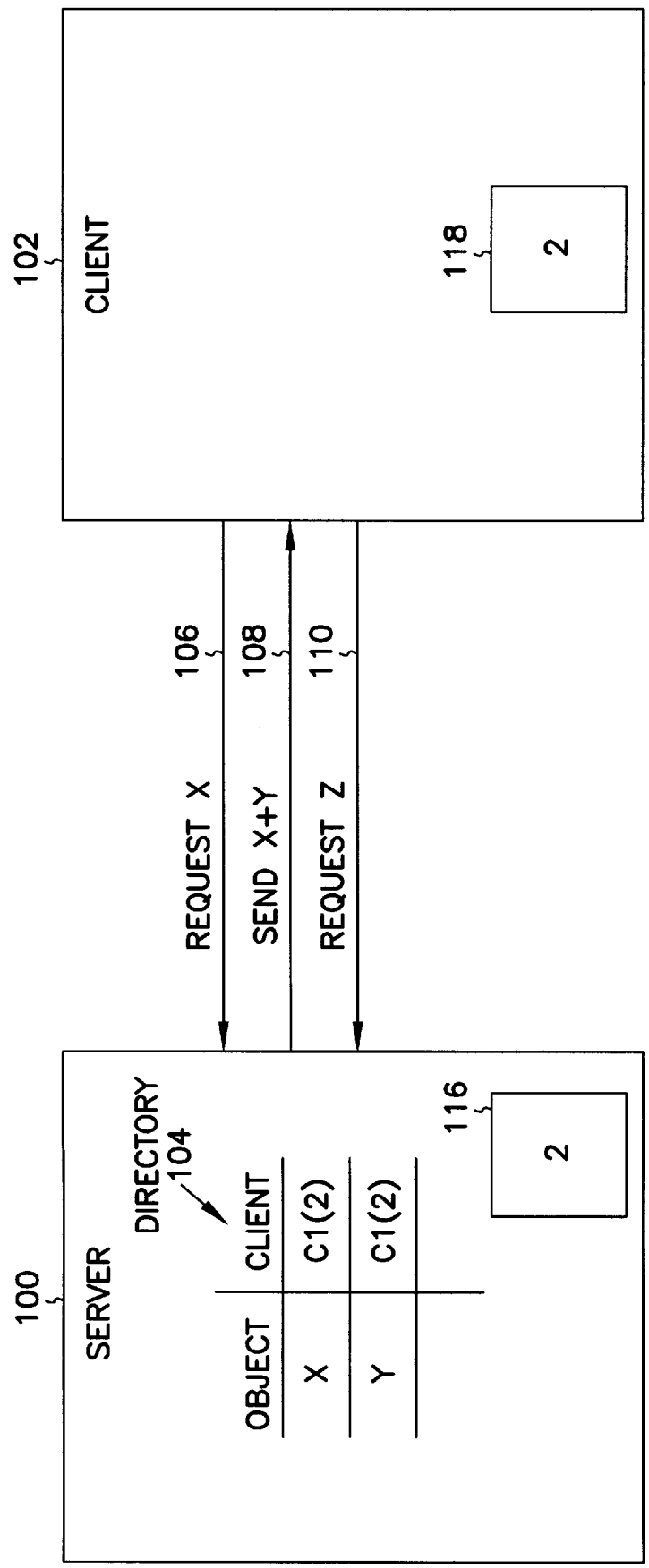
Figure 1E:
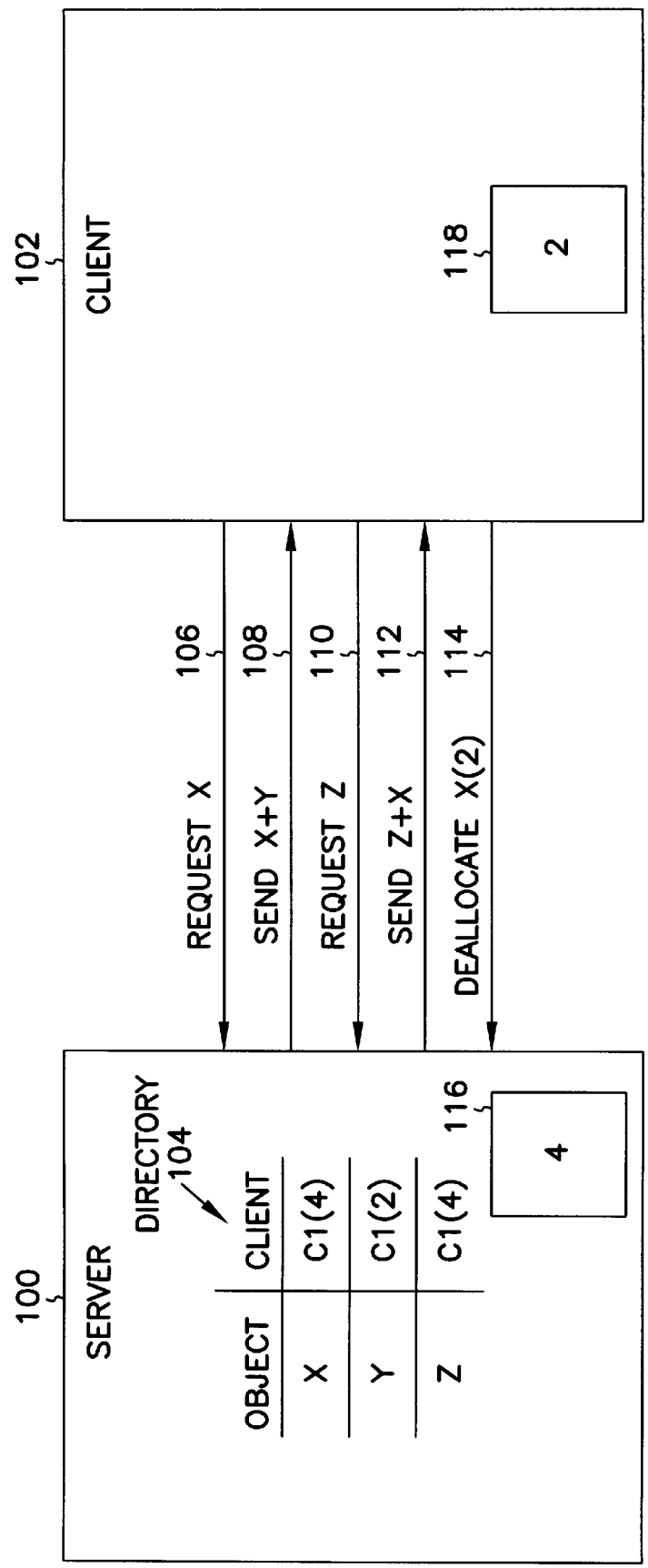

As shown in FIG. 1C, upon receiving message 106, the server 100 prefetches one or more additional objects, such as object Y, increments the counter once for the requested object and once for each prefetched object, allocates the requested object and the prefetched object by entering client entries into the directory structure 104, and sends objects X and Y to the client 102 in message 108. The directory structure 104 contains, in addition to an indication of the client allocating an object, the current value of the counter 116 at the time in which the allocation occurred. For example, the entry for object X indicates "C1" for client 102 and "2" indicating that the value of the counter was 2 at the time of the allocation. As shown in FIG. 1D, upon receiving objects X and Y in message 108, the client 102 increments its counter 118 for each object received. Then, sometime later, the client requests an additional object, object Z, in message 110. After receiving message 110, as shown in FIG. 1E, the server 100 prefetches one or more additional objects, such as object X, increments the counter 116 once for the requested object and once for the prefetched object, allocates the objects, and returns objects Z and X in message 112. The directory entry for object Z contains "C1" and "4" indicating that object Z has been allocated to client C1 when the value of the counter was set to 4, and the previous directory entry for object X has been overwritten with a new directory entry.

At this point, the client's counter 118 indicates a value of 2 because it is aware only of objects X and Y sent in message 108. The client 102 has not yet received the message 112 containing objects Z and X. While in this state, the client 102 requests the deallocation of object X by sending a message 114 containing the current value of the client's counter 118. In order to prevent the synchronization problem described in FIG. 1A from occurring, the server 100 compares the value ("2") contained in message 114 with the client entry in the directory 104 for object X. Since the client entry contains a value of 4 and the message 114 contains a value of 2, the system has detected that object X has been sent to the client 102, and while the object was in transit and not yet received by the client, the client sent message 114 requesting the deallocation of object X. In this situation, the server 100 ignores message 114 and does not deallocate object X so as to prevent the client 102 and the server from becoming unsynchronized with respect to their understanding of whether object X is allocated.

Figure 1F:
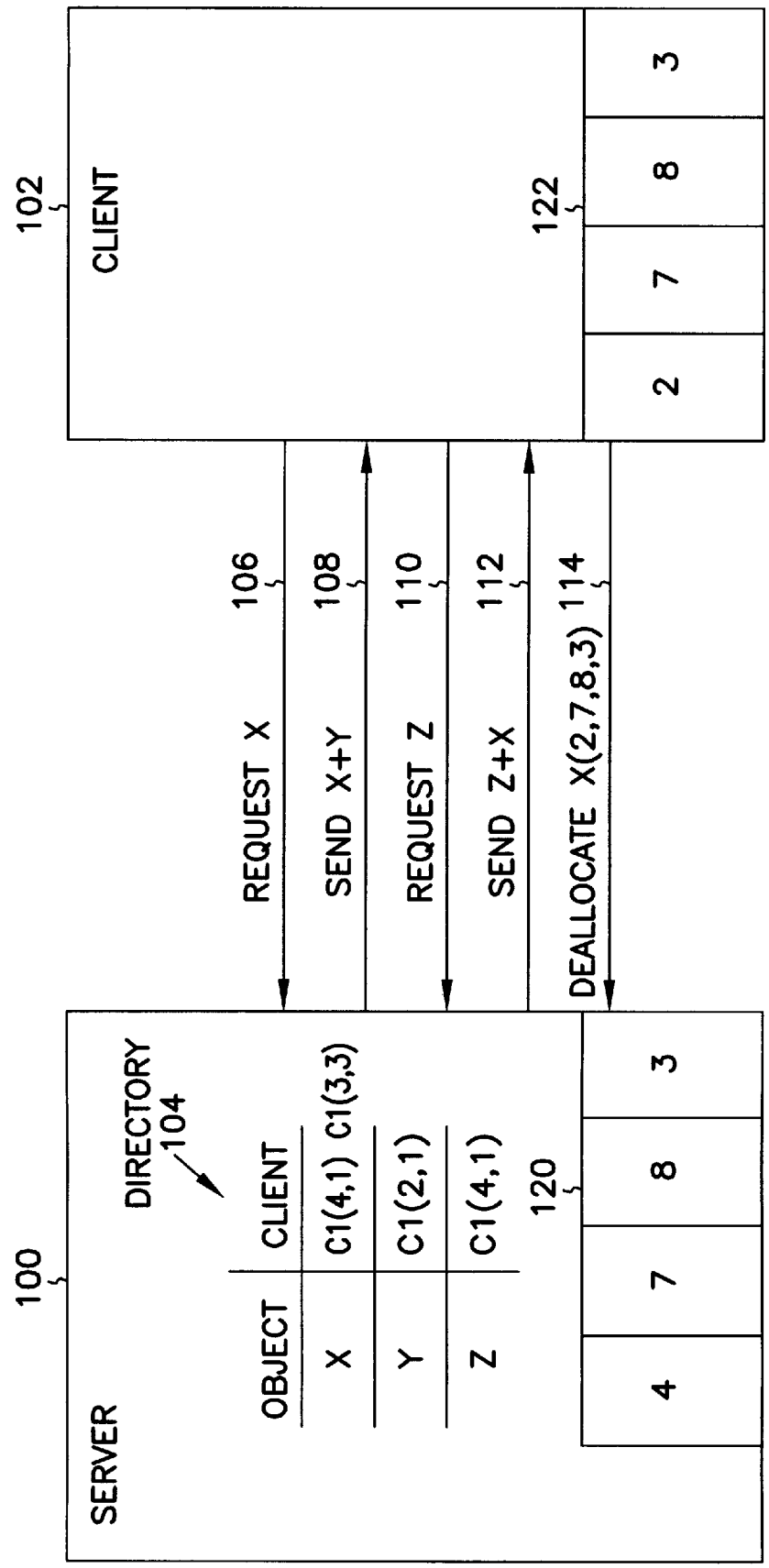
FIG. 1F depicts the use of counters by an alternative embodiment of the present invention to solve the synchronization problem depicted in FIG. 1A for multithreaded clients.

In an alternative embodiment, the client 102 may have more than one connection to the server 100 with each connection being handled by a separate thread of the client 102. FIG. 1F depicts how an alternative embodiment of the improved resource allocation system operates to handle such a situation. The server 100 and the client 102 maintain an array of individual counters 120 and 122 with each individual counter corresponding to one of the threads of the client 102. Each client entry of the directory 104 contains an indication of the client, an indication of a value of the counter (e.g., 4) at the time the object was allocated, and an indication of which thread allocated the object (e.g., 1). A client entry is maintained in the directory for each thread that has allocated a particular object. For example, the directory 104 has two client entries for object X: both thread 1 of client C1 and thread 3 of client C1 have allocated object X. Each client entry in the directory 104 indicates the last time that the particular object was allocated to a thread. Thus, if the same thread allocates the object for a second time, the previous client entry for that thread is overwritten.

To handle synchronization in the multithreading environment, when the deallocation message 114 is sent by the client 102, the client sends the values for its array of thread counters 122 (e.g., 2, 7, 8, 3). In order to detect the synchronization problem described above, upon receiving a deallocation request 114, the server 100 compares each client entry for object X to determine if the object was allocated on a thread such that the client 102 did not know of the allocation before the client issued the deallocation request 114. For each thread having a client entry, the server 100 compares the value within the client entry against the corresponding value received in the deallocation message 114. For example, with respect to the client entries for object X, the value in the first client entry (i.e., 4) is compared against the value for the first thread counter received in message 114 (i.e., 2) and the value in the second client entry (i.e., 3) is compared against the value for the third thread counter (i.e., 8) received in the message 114. If any of these comparisons indicate that the value in the directory 104 is greater than the value received in the deallocation message 114, a copy of the object was in transit to the client 102 when the client 102 sent the deallocation request 114. In this situation, the deallocation request 114 should be ignored to ensure that the client 102 and the server 100 remain synchronized.

Implementation Details

Figure 2:
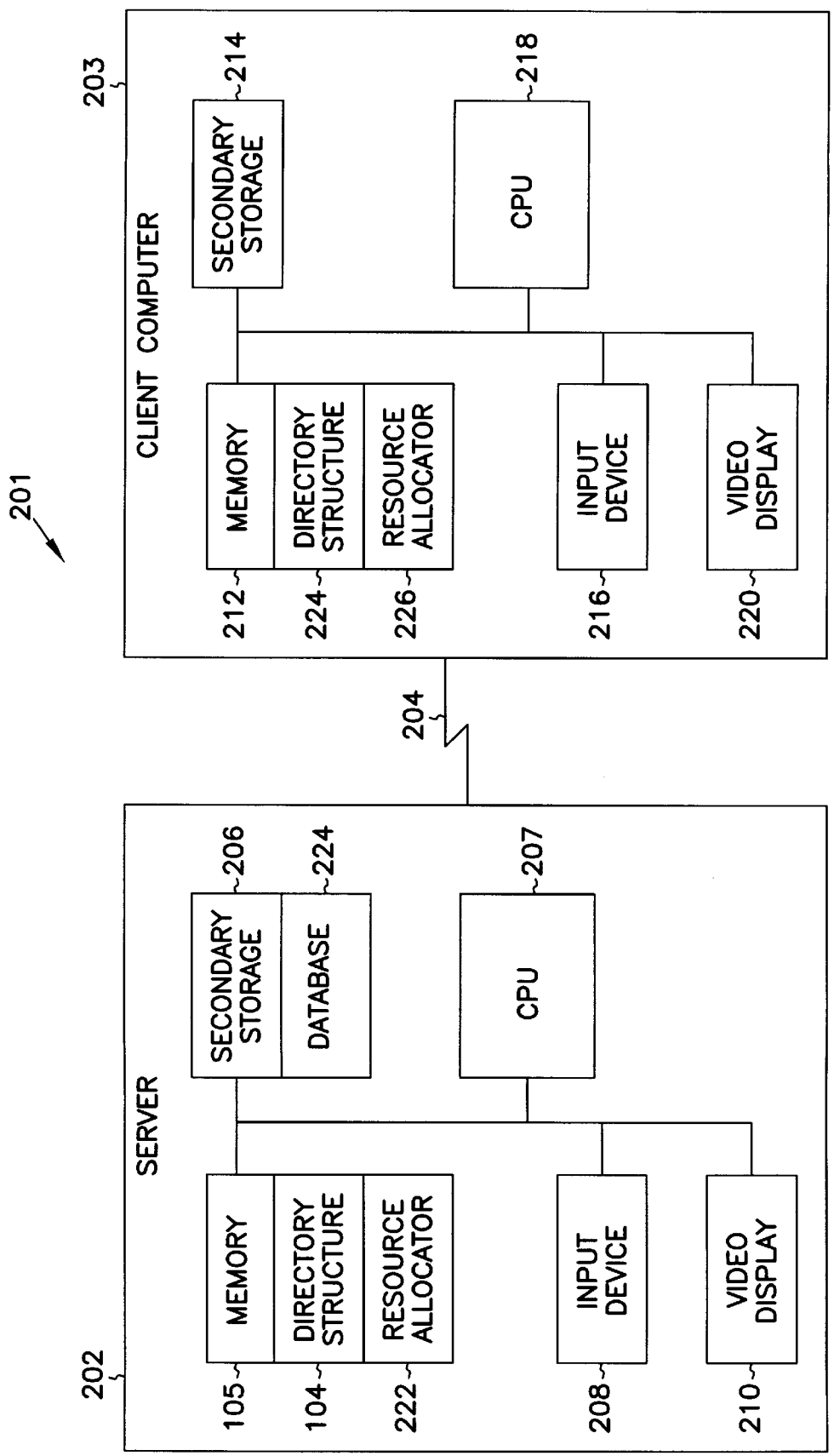
FIG. 2 depicts a data processing system that is suitable for practicing a preferred embodiment of the present invention.

FIG. 2 depicts a data processing system 201 that is suitable for practicing a preferred embodiment of the present invention. The data processing system 201 includes a server computer 202 and a client computer 203 interconnected via a network 204. The server computer 202 contains a memory 205, a secondary storage device 206, a central processing unit (CPU) 207, an input device 208, and a video display 210. The memory 205 contains the directory structure 104 and the improved resource allocation system (resource allocator 222). The directory structure 104, as stated above, contains allocation information, and the resource allocator 222 is responsible for allocating database objects to clients and for ensuring that the clients and the resource allocator are synchronized. The secondary storage device 206 contains a database 224 containing the database objects allocated by the resource allocator 222.

The client computer 203 contains a memory 212, a secondary storage device 214, a CPU 218, an input device 216, and a video display 220. The memory 212 contains a client program 224 acting as the client for the objects allocated by the resource allocator 222 and contains an object cache 226 that stores the objects allocated to the client program by the resource allocator.

Figure 3:
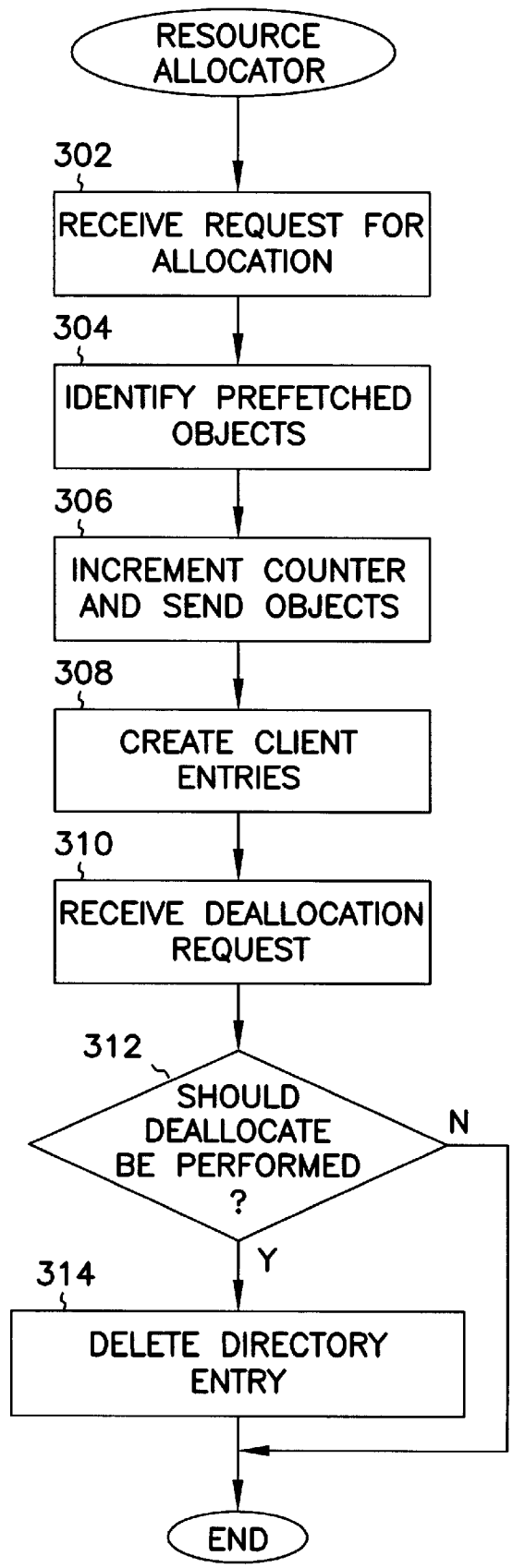
FIG. 3 depicts a flowchart of the steps performed by the resource allocation system of a preferred embodiment of the present invention.

FIG. 3 depicts a flowchart of the steps performed by the resource allocator 222 when allocating objects and deallocating objects so as to ensure that synchronization problems do not occur between the client program and the resource allocator. Any differences in processing between a preferred embodiment and the alternative embodiment are indicated below. The first step performed by the resource allocator is to receive a request to allocate an object (step 302). In this step, the client program has sent a request to allocate an object. After receiving the request, the resource allocator identifies a number of prefetched objects (step 304). In this step, the resource allocator may use any of a number of prefetching algorithms. For example, when the requested database object is the field of a record, the prefetching algorithm may return other fields within the same record, and when the requested database object is a record, the prefetching algorithm may return other records within the table.

After identifying a number of prefetched objects, the resource allocator increments its counter for every object to be sent and sends the objects to the client (step 306). Next, the resource allocator creates a client entry in the directory for each allocated object (step 308). In this step, for each allocated object, the resource allocator stores an indication of the client as well as the current value of the counter. In the alternative (multithreaded) embodiment, the resource allocator would additionally store an indication of the particular thread of the client requesting the object. At a later time, the resource allocator receives a deallocation request (step 310). Contained in the deallocation request is an identification of the object to be deallocated as well as the current value of the client's counter. In the multithreaded embodiment, the current value of each thread's counter is transmitted. The resource allocator then determines whether the deallocation should be performed (step 312). In this step, the resource allocator compares the received value in the deallocation request against the client entry stored in the directory to determine if the value stored in the directory is greater than the value received in the deallocation request. If so, a copy of the object is in transit to the client and the deallocation should not occur. In the case of the multithreaded embodiment, each entry in the directory for each thread of the client is compared against the corresponding values received in the deallocation request. If any of the values in the client entries are greater than the values received in the deallocation request, then deallocation should not occur. When it is determined that deallocation should not occur, processing ends. However, if it is determined that deallocation should occur, the resource allocator deletes the client entry in the directory (step 314). In the multithreaded embodiment, the resource allocator deletes all entries for all threads of the client having allocated the object.

Figure 4:
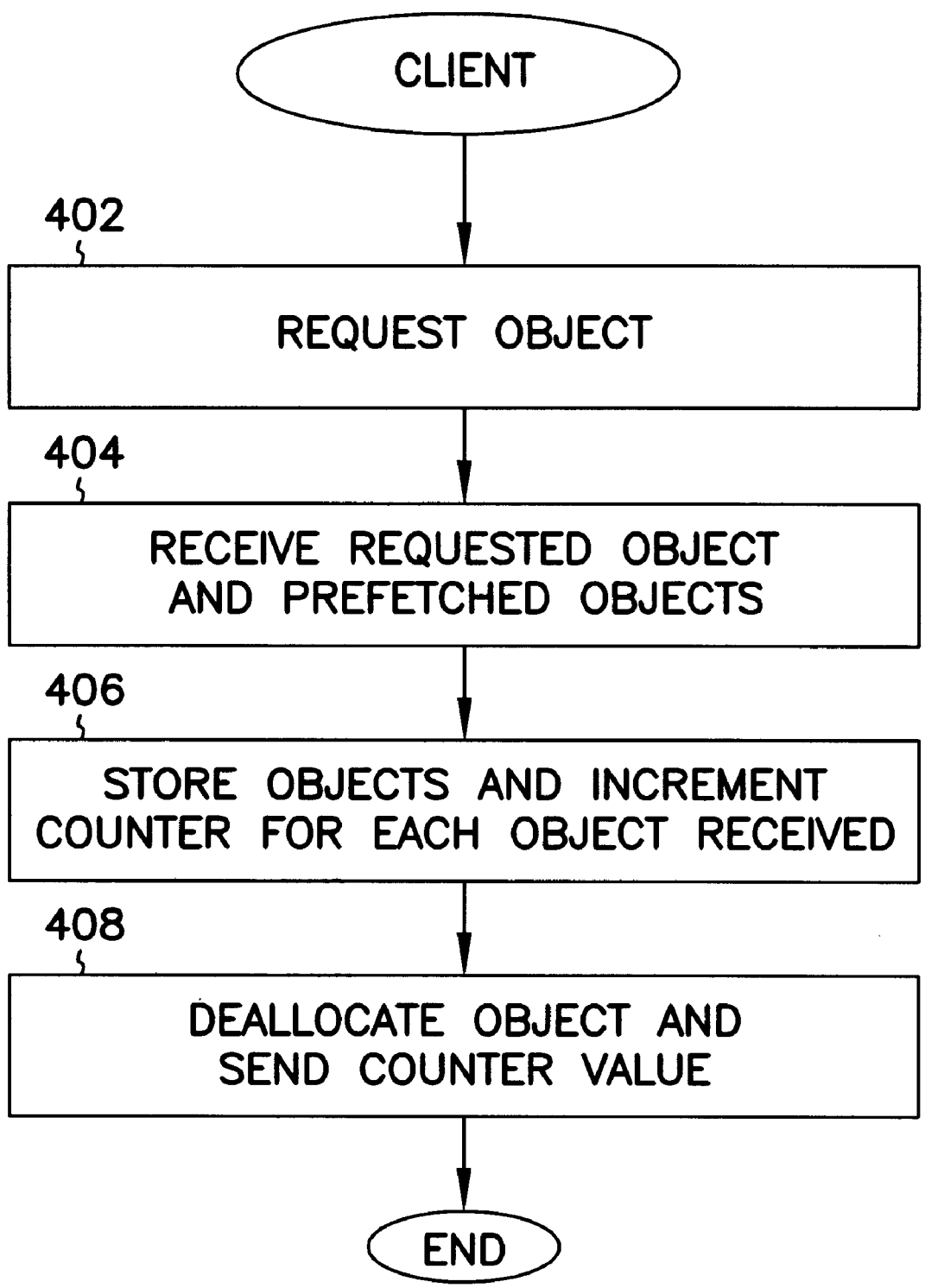
FIG. 4 depicts a flowchart of the steps performed by a client program when interacting with the resource allocation system.

FIG. 4 depicts a flowchart of the steps performed by a client program when allocating and deallocating objects. In the alternative (i.e., multithreaded) embodiment, these steps are performed by a single thread. The first step performed by the client program is to request an object's allocation by sending the request to the resource allocator (step 402). After sending a request to the resource allocator, the client program receives the requested object as well as some additional prefetched objects (step 404). Upon receiving the objects, the client program stores these objects into its cache, and the client increments the counter for each object received (step 406). After incrementing the counter, at a later time, the client program will request the deallocation of the object and send the current counter value as part of the request (step 408). In the multithreaded embodiment, the client program will send the values of its array of counters. The resource allocator, upon receiving the deallocation request, will then determine whether to ignore the request to ensure that the client program and the resource allocator remain synchronized with respect to the state of the object.

While the present invention has been described with reference to a preferred embodiment thereof, those skilled in the art will know of various changes in form that may be made without departing from the spirit and scope of the claimed invention as defined in the appended claims.

What is claimed is:

1. A method in a data processing system having a server that manages allocation of database objects and a client that requests allocation of the database objects, wherein the server maintains a server counter that is incremented each time that a database object is allocated to the client, and wherein the client maintains a client counter that is incremented each time that the client is made aware of an allocation of a database object on its behalf, comprising the steps of:

the client requesting allocation of a first of the database objects;

the server allocating the first database object to the client, updating the server counter, and sending an indication of the allocation of the first database object to the client;

the client receiving the indication of the allocation of the first database object, updating the client counter, and requesting allocation of a second of the database objects;

the server allocating the second database object to the client, prefetching additional database objects, allocating the additional database objects to the client, sending an indication of the allocation of the second database object and the additional database objects to the client, and updating the server counter, wherein the first database object is allocated for a second time to the client as part of the allocation of the additional database objects;

the client sending a request to deallocate the first database object, wherein a value of the client counter is sent to the server as part of the deallocation request;

the server determining whether the sending of the deallocation request corresponds to the allocation of the first database object for the second time by comparing the value of the client counter in the deallocation request to a value of the server counter; and when the comparing indicates that the value of the client counter in the deallocation request is not equal to the value of the server counter, determining that the sending of the deallocation request does not correspond to the allocation of the first database object for the second time; and when the server determines that the sending of the deallocation request does not correspond to the allocation of the first database object for the second time, the server ignoring the deallocation request to prevent the client from having an indication that the first database object is allocated on its behalf when the server has deallocated the first database object from the client.

2. The method of claim 1, further including the step of:
when the server determines that the sending of the deallocation request does correspond to the allocation of the first database object for the second time,
the server deallocating the first database object from the client.

3. The method of claim 1 wherein the step of the server allocating the first database object to the client includes sending a copy of the first database object to the client.

4. The method of claim 1 wherein the server determines that the sending of the deallocation request does not correspond to the allocation of the first database object for the second time only when the value of the client counter in the deallocation request is less than the value of the server counter.

5. The method of claim 1 wherein the server maintains a directory structure that contains allocation information, and wherein the step of allocating the additional database objects includes the server storing in the directory structure an indication that the client has allocated the first database object and an indication of the value of the server counter.

6. The method of claim 5 wherein the step of the server determining includes comparing the value of the client counter with the value of the server counter stored in the directory structure.

7. The method of claim 1 wherein the client has a plurality of threads that allocate the database objects, wherein the server maintains a server thread counter for each thread that is incremented each time that a database object is allocated to the thread, wherein the client maintains a client thread counter for each thread that is incremented each time that the thread is made aware of an allocation of a database object, wherein the step of the client sending a request to deallocate the first database object includes sending the request to the server that includes a value of each client thread counter, and wherein the step of the server determining includes the steps of:

the server comparing the values of each client thread counter in the request with a value of the corresponding server thread counters; and when the value of at least one of the values of the client thread counters in the request is less than the value of the corresponding server thread counter, the server determining that the sending of the deallocation request does not correspond to the allocation of the first database object for the second time.

8. A method in a data processing system having a server that manages allocation of resources and a client that requests allocation of the resources, the method performed by the server comprising the steps of:

receiving a request to allocate a resource to the client;

allocating the resource to the client and allocating additional resources to the client;

incrementing a server counter for each allocated resource;

receiving a request to deallocate one of the allocated resources, wherein the request includes a value of a counter maintained by the client that is incremented each time that the client is made aware of the allocation of a resource on its behalf;

determining whether to deallocate the resource by comparing a value of the server counter to the value of the client counter received in the deallocation request; and when it is determined to not deallocate the resource,
ignoring the deallocation request to prevent the server and the client from having conflicting indications of the allocation of the resource.

9. The method of claim 8 wherein the resources are database objects.

10. The method of claim 8, further including the step of:
when it is determined to deallocate the resource,
deallocating the resource.

11. The method of claim 8 wherein the server maintains a directory structure that contains allocation information, and wherein the step of allocating the resource includes storing in the directory structure an indication that the client has allocated the resource and an indication of the value of the server counter.

12. The method of claim 11 wherein the step of determining includes comparing the value of the client counter with the value of the server counter stored in the directory structure.

13. A method in a data processing system having a server that manages allocation of resources and a client that requests allocation of the resources, the method performed by the client comprising the steps of:

requesting the server to allocate a resource, whereupon the resource is allocated by the server; and requesting that the server deallocate the resource, wherein before the server deallocates the resource, the server determines whether the server has allocated the resource for a second time such that the client was unaware of the second time allocation before the client made the deallocation request, and wherein when the server determines that the resource has been allocated for a second time such that the client was unaware of the second time allocation before the client made the deallocation request, the server ignores the deallocation request to prevent the client and the server from having conflicting indications of the allocation of the resource.

14. A method in a data processing system having a server that manages allocation of resources and a client that requests allocation of the resources, the method comprising the steps of:

allocating a resource to the client;

receiving a request to deallocate the resource from the client;

determining whether the resource was allocated for at least a second time to the client before the deallocation request was sent by the client such that the client was unaware of the at least a second time allocation before the deallocation request was sent by the client; and when the resource was allocated for at least a second time to the client before the deallocation request was sent by the client such that the client was unaware of the at least a second time allocation before the deallocation request was sent by the client, ignoring the deallocation request to prevent the client and the server from having conflicting indications of the allocation of the resource.

15. The method of claim 14 wherein the step of allocating the resource is responsive to a request received from the client.

16. The method of claim 14 wherein the step of allocating the resource is responsive to a request from the client for allocation of a second resource such that the server allocated the first resource as part of a prefetching strategy.

17. The method of claim 16 wherein the step of allocating the resource includes sending a copy of the resource to the client.

18. The method of claim 14 wherein the server maintains a server counter that is incremented each time that the server allocates a resource, wherein the client maintains a client counter that is incremented each time it is made aware of an allocation of a resource on its behalf, wherein the deallocation request contains a value of the client counter, and wherein the step of determining includes determining whether the value of the client counter in the deallocation request is less than a value of the server counter and determining to ignore the deallocation request when the value of the client counter is less than the value of the server counter.

19. The method of claim 18 wherein a plurality of clients interact with the server and the server maintains one counter for each client.

20. The method of claim 18 wherein the server maintains a directory structure that contains allocation information, and wherein the step of allocating the resource includes storing in the directory structure an indication that the client has allocated the resource and an indication of the value of the server counter.

21. The method of claim 20 wherein the step of determining to ignore the deallocation request includes comparing the value of the client counter with the value of the server counter stored in the directory structure.

22. The method of claim 14 wherein the client has a plurality of threads that each communicate with the server, wherein the server maintains a server thread counter for each thread and the client maintains a client thread counter for each thread, wherein the deallocation request includes a value for each of the client thread counters, and wherein the step of determining includes determining to ignore the deallocation request when the resource has been allocated to at least one thread such that a value of the client thread counter in the deallocation request is less than the value of the corresponding server thread counter.

23. A data processing system having resources comprising:
   a memory comprising:
      a client program for requesting allocation of the resources and for requesting deallocation of the resources;
      a server program for managing allocation of the resources, for receiving allocation requests, for allocating the resources in response to receiving the allocation requests, for receiving deallocation requests, and for determining to ignore the deallocation requests such that a deallocation request requesting the deallocation of a resource is ignored when the resource was allocated for at least a second time to the client program and the client program was unaware of the at least a second time allocation before the deallocation request was made by the client program; and
   a processor for running the server program and the client program.

24. The data processing system of claim 23, further including a secondary storage device containing a database, and wherein the resources are database objects.

25. The data processing system of claim 23 wherein the client program is located in a memory of a first computer and wherein the server program is located in a memory of a second computer that is communicatively linked to the first computer.

26. The data processing system of claim 25 wherein the server program sends a copy of a resource to the client program when the server program allocates the resource to the client program.

27. A computer-readable memory device containing a data structure containing allocation information utilized by a server when allocating resources to a client and utilized by the server when deallocating resources from the client, the server maintaining a counter that is incremented each time that a resource is allocated to the client, the client maintaining a counter that is incremented each time that the client is made aware that a resource has been allocated on its behalf, the data structure containing entries for each resource, each entry containing:
   an indication of the client allocating the resource and a value of the server counter at the time of the allocation of the resource, wherein when the server receives a request to deallocate the resource from the client, the request contains a value of the client counter and wherein the server compares the value of the client counter with the value of the server counter stored in the entry to determine whether to perform the deallocation of the resource.

28. A computer-readable medium containing instructions for controlling a data processing system to perform a method, the data processing system having a server that manages allocation of resources and a client that requests allocation of the resources, the method performed by the server comprising the steps of:
   receiving a request to allocate a resource to the client;
   allocating the resource to the client and allocating additional resources to the client;
   incrementing a server counter for each allocated resource;
   receiving a request to deallocate one of the allocated resources, wherein the request includes a value of a counter maintained by the client that is incremented each time that the client is made aware of the allocation of a resource on its behalf;
   determining whether to deallocate the resource by comparing a value of the server counter to the value of the client counter received in the deallocation request; and
   when it is determined to not deallocate the resource,
      ignoring the deallocation request to prevent the server and the client from having conflicting indications of the allocation of the resource.

29. The computer-readable medium of claim 28 wherein the resources are database objects.

30. The computer-readable medium of claim 28, further including the step of:
   when it is determined to deallocate the resource,
      deallocating the resource.

31. The computer-readable medium of claim 28 wherein the server maintains a directory structure that contains allocation information, and wherein the step of allocating the resource includes storing in the directory structure an indication that the client has allocated the resource and an indication of the value of the server counter.

32. The computer-readable medium of claim 31 wherein the step of determining includes comparing the value of the client counter with the value of the server counter stored in the directory structure.

33. A computer-readable medium containing instructions for controlling a data processing system to perform a method, the data processing system having a server that manages allocation of resources and a client that requests allocation of the resources, the method performed by the client comprising the steps of:

requesting the server to allocate a resource, whereupon the resource is allocated by the server; and requesting that the server deallocate the resource, wherein before the server deallocates the resource, the server determines whether the server has allocated the resource for a second time such that the client was unaware of the second time allocation before the client made the deallocation request, and wherein when the server determines that the resource has been allocated for a second time such that the client was unaware of the second time allocation before the client made the deallocation request, the server ignores the deallocation request to prevent the client and the server from having conflicting indications of the allocation of the resource.

34. A computer-readable medium containing instructions for controlling a data processing system to perform a method, the data processing system having a server that manages allocation of resources and a client that requests allocation of the resources, the method comprising the steps of:

allocating a resource to the client;

receiving a request to deallocate the resource from the client;

determining whether the resource was allocated for at least a second time to the client before the deallocation request was sent by the client such that the client was unaware of the at least a second time allocation before the deallocation request was sent by the client; and when the resource was allocated for at least a second time to the client before the deallocation request was sent by the client such that the client was unaware of the at least a second time allocation before the deallocation request was sent by the client, ignoring the deallocation request to prevent the client and the server from having conflicting indications of the allocation of the resource.

35. The computer-readable medium of claim 34 wherein the step of allocating the resource is responsive to a request received from the client.

36. The computer-readable medium of claim 34 wherein the step of allocating the resource is responsive to a request from the client for allocation of a second resource such that the server allocated the first resource as part of a prefetching strategy.

37. The computer-readable medium of claim 36 wherein the step of allocating the resource includes sending a copy of the resource to the client.

38. The computer-readable medium of claim 34 wherein the server maintains a server counter that is incremented each time that the server allocates a resource, wherein the client maintains a client counter that is incremented each time it is made aware of an allocation of a resource on its behalf, wherein the deallocation request contains a value of the client counter, and wherein the step of determining includes determining whether the value of the client counter in the deallocation request is less than a value of the server counter and determining to ignore the deallocation request when the value of the client counter is less than the value of the server counter.

39. The computer-readable medium of claim 38 wherein a plurality of clients interact with the server and the server maintains one counter for each client.

40. The computer-readable medium of claim 38 wherein the server maintains a directory structure that contains allocation information, and wherein the step of allocating the resource includes storing in the directory structure an indication that the client has allocated the resource and an indication of the value of the server counter.

41. The computer-readable medium of claim 40 wherein the step of determining to ignore the deallocation request includes comparing the value of the client counter with the value of the server counter stored in the directory structure.

42. The computer-readable medium of claim 34 wherein the client has a plurality of threads that each communicate with the server, wherein the server maintains a server thread counter for each thread and the client maintains a client thread counter for each thread, wherein the deallocation request includes a value for each of the client thread counters, and wherein the step of determining includes determining to ignore the deallocation request when the resource has been allocated to at least one thread such that a value of the client thread counter in the deallocation request is less than the value of the corresponding server thread counter.

* * * * *